Nov. 26, 1968    A. MARZOCCHI    3,413,186
ELASTOMERIC-GLASS FIBER PRODUCTS AND PROCESS
AND ELEMENTS FOR USE IN SAME
Filed Aug. 18, 1966
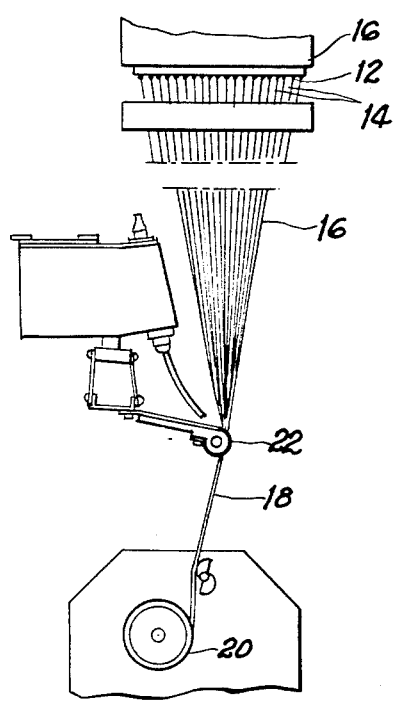
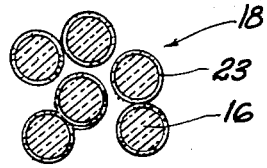
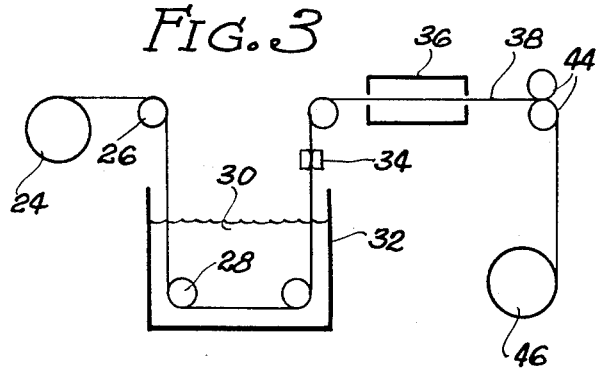
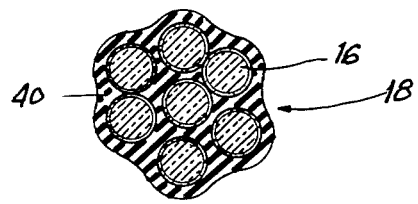
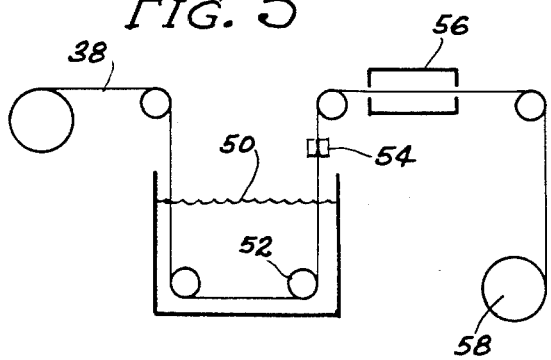
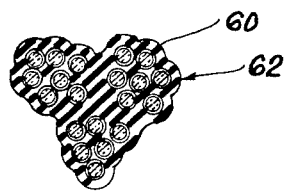
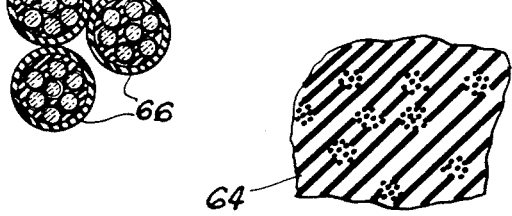
INVENTOR
Alfred Marzocchi
by Staelin & Overman
Attys United States Patent Office 3,413,186
Patented Nov. 26, 1968

3,413,186
ELASTOMERIC-GLASS FIBER PRODUCTS AND
PROCESS AND ELEMENTS FOR USE IN SAME
Alfred Marzocchi, Cumberland, R.I., assignor to
Owens-Corning Fiberglas Corporation, a corporation of Delaware
Continuation-in-part of application Ser. No. 218,724,
Aug. 22, 1962. This application Aug. 18, 1966, Ser.
No. 573,267
The portion of the term of the patent subsequent to
Nov. 22, 1983, has been disclaimed and dedicated
to the Public
13 Claims. (Cl. 161—176)

ABSTRACT OF THE DISCLOSURE

This invention is addressed to the glass fiber reinforcement of products formed of elastomeric materials wherein the glass fiber reinforcement is formulated of the glass fibers having an anchoring agent applied onto the surfaces thereof after which the glass fibers are gathered together in the form of a bundle which is impregnated to apply a second coating onto the glass fiber surfaces with an elastomeric composition and wherein the impregnated bundle of glass fibers is provided with an overcoating in the form of a second coat of elastomeric material. The composite is then suitable for use in combination with the continuous phase elastomer in the fabrication of the glass fiber-elastomeric product.

This is a continuation-in-part of my copending application Ser. No. 218,724, now Patent No. 3,287,204, filed August 22, 1962, and entitled, "Elastomeric-Glass Fiber Products and Process and Elements for Use in Same."

This invention relates to glass fiber-elastomeric products and to methods and materials for use in the preparation of same and it relates more particularly to glass fiber-elastomeric products having improved strength, improved flexibility, improved resiliency and wear, and improved dimensional stability.

It is an object of this invention to produce and to provide a method for producing glass fiber-elastomeric products wherein a strong and permanent bonded relationship is established betwen the glass fibers and the elastomeric material forming the continuous phase of the glass fiber-elastomeric product; whereby interfacial separation between the glass fiber system and the matrix of the continuous phase elastomeric material is substantially avoided thereby to maximize the utilization of the desirable properties of the glass fibers in the glass fiber-elastomeric product; in which the area between the glass fiber bundles is substantially completely filled with elastomeric material which ties in with the continuous phase elastomer thereby to cushion the glass fibers for improvement in flexural strength and wear and more completely to tie in the glass fiber component with the continuous phase elastomeric system, and in which cure or vulcanization is carried into the glas fiber system to form the elastomeric materials into a substantially continuous phase or monolithic system which engulfs the glass fibers.

These and other objects and advantages of this invention will hereinafter appear and for purposes of illustration, but not of limitation, embodiments of the invention are shown in the accompanying drawings, in which—

FIG. 1 is a schematic elevational view of the glass fiber forming and sizing process;

FIG. 2 is a sectional view of a fragmentary portion of the glass fiber bundle produced by the sizing equipment of FIG. 1;

FIG. 3 is a schematic view of the arrangement of elements for the impregnation of the glass fiber bundle;

FIG. 4 is a sectional view of a fragmentary portion of the impregnated glass fiber bundle;

FIG. 5 is a schematic view of the arrangement of equipment for overcoating the impregnated glass fiber bundle;

FIG. 6 is a sectional view of a fragmentary portion of the overcoated glass fiber bundle;

FIG. 7 is a sectional view of a fragmentary portion of a glass fiber bundle overcoated with a layer of elastomeric material; and FIG. 8 is a sectional view of a fragmentary portion of the glass fiber-elastomeric product produced in accordance with the practice of this invention.

In the aforementioned copending application, description is made of a process and product wherein plural treatments are applied to the glass fiber system for the purpose of effecting a stronger and more permanent bonded relationship between the glass fibers and the continuous phase eleastomeric material of the glass fiber-elastomeric product. The plural treatments described in the aforementioned copending application include a first treatment in which the individual glass fibers are sized or coated with a material containing an anchoring agent for intertying or interbonding the elastomeric materials with the glass fiber surfaces; a second treatment which is applied, preferably after the sized fibers have been gathered together into a glass fiber bundle such as a strand, yarn, cord or thread, and wherein the glass fiber bundle is impregnated with a composition containing an elastomeric material substantially to fill the interstices between the fibers and coat the glass fibers; and in which a third treatment is applied to the bundle of impregnated glass fibers wherein the impregnated bundle is overcoated with a composition referred to as an interfacial bonding coat which tends to assimilate the treated glass fiber system with the continuous phase elastomeric material with which the treated glass fibers are combined in the manufacture of the glass fiber-elastomeric product and wherein the assimilation coat appears to operate in a manner to eliminate interfacial separations between the continuous phase elastomer and the treated glass fibers during the molding or vulcanizing operation.

In the aforementioned application, the assimilation coat is described as being formulated of an organo silicon compound formed of a silane having from 1 to 3 hydrolyzable groups and an organic group attached to the silicon atom containing an amine or an ethylenic group or in which the assimilation agent comprises an isocyanate, a phenolic end-blocked isocyanate, or ethylene dimethacrylate.

It has been found that considerable improvement can be experienced in the glass fiber-elastomeric product produced when an outer sheath or layer of an elastomeric material is employed instead of the assimilation coat of the aforementioned copending application.

Various explanations are possible for the improvement that is secured by the concepts of this invention. One logical explanation is indicated by observation of the void that exists between the bundles of glass fibers when a number of such bundles are intertwisted or plied to form the cords used to reinforce the continuous phase elastomeric materials in the manufacture of tires, belts and the like structures. Such voids between the strands or bundles are incapable of being filled by the elastomeric material present as an impregnant in the glass fiber bundles and the continuous phase elastomeric material is incapable of the amount of penetration of the cords formed of the glass fiber bundles with the result that voids remain in the interior of the glass fiber system. Such voids permit movement of the glass fibers and permit destruction by mutual abrasion with resultant decreased life and utility of the glass fiber reinforcement. It also results in the utilization of only a fraction of the fibrous components as a reinforcement for the elastomeric material and in the failure to achieve an effective tie-in between the fibers making up the interior of the cord and the elastomeric material.

Another possible explanation is the lack of cure through the glass fiber system for complete integration with the cured or vulcanized continuous phase elastomer whereby a mono-lithic structure is incapable of being formed as the final product.

When the impregnated glass fiber bundles are over-coated to provide a sheath of elastomeric material, preferably a curable elastomeric material, a high concentration of elastomer is made available at the surfaces of the glass fiber bundles and in the portion of the bundles immediately adjacent the voids running through the central portion of the cords or yarns whereby, during subsequent molding or cure, sufficient free rubber is available at the peripheries for flow into the voids substantially completely to fill the voids and blend with the continuous phase elastomer for simultaneous cure of vulcanization. Thus the glass fibers are cushioned one from the other and the void is substantially completely filled with elastomeric material capable of blending with the continuous phase elastomer and capable of cure therewith to overcome many of the deficiencies of the type previously pointed out. The result is a composite structure of continuous phase cured elastomer with the bundle of glass fibers completely embedded and inter-tied into the cured elastomeric system without noticeable separation or areas capable of separation in between.

Having described the theoretical concepts of this invention, illustration will now be made of the practice thereof with reference being made to the accompanying drawings. As in the aforementioned copending application, the term "elastomer" is meant to include such synthetic elastomeric or rubber-like materials as neoprene, butadiene, chloroprene, isoprene, butyl rubber and the like, or copolymers thereof with acrylonitrile, styrene and the like, and especially elastomeric materials which are curable or vulcanizable by reaction to a set stage by peroxide or through sulphur linkages. The term is also meant to include natural rubbers and modifications thereof such as chlorinated rubber and the like.

The term "glass fibers" is meant to refer to continuous glass fibers in the form of filaments, strands, yarns, bundles, cords and fabrics formed thereof and it is intended also to include discontinuous glass fibers in the form of glass wool fibers and yarns and fabrics formed thereof or fibers of the continuous or discontinuous types which have been cut, chopped or otherwise reduced to shorter lengths, but usually to lengths greater than about ⅛ inch.

The practice of this invention will correspond to the practice in the aforementioned copending application up to and through the first treatment of the glass fibers to apply a size coating containing an anchoring agent onto the glass fiber surfaces and the impregnation of the bundle of glass fibers with a composition containing an elastomeric material as hereinafter described.

Example 1.—Preparation of treated glass fibers

In FIG. 1 of the drawings, a schematic illustration is made of a means for the production of endless lengths of glass fibers including a glass fiber melting furnace 10 having a bushing 12 on the bottom side thereof provided with a plurality of openings. The streams 14 of molten glass, flowing gravitationally from the openings in the bushing, are rapidly attenuated into fine filaments 16 by winding the filaments, after they have been gathered together to form a strand 18, about a rapidly rotating winding drum 20.

The separate filaments of glass fibers are coated before and preferably as they are being gathered together into a single bundle or strand. For this purpose, use is made of an applicator 22, which may be in the form of a wiping pad wet with the fluid treating composition and over which the glass fiber filaments are drawn as they are gathered together to form the strand 18.

The composition applied to the glass fibers in forming is formulated to contain an anchoring agent, preferably gamma-aminopropyltriethoxy silane, or other anchoring agent as will hereinafter be described. The coating composition may be applied from a solution in a suitable volatilizable carrier, as illustrated by the following compositions A and B, but it is preferred to embody the anchoring agent as a component in a conventional size composition of the type represented by the formulations C and D. When employed in a treating composition, as in compositions A or B, or in combination with a film forming material and lubricant, as in the size compositions C and D, it is desirable to make use of a composition containing the anchoring agent in an amount within the range of 0.1 to 5.0 percent by weight and preferably in an amount within the range of 0.5 to 2.0 percent by weight. The following compositions are given by way of illustration, but not by way of limitation, of the treating compositions which may be employed as the first coating applied to the glass fiber surfaces:

Composition A.—0.1–5.0 percent by weight gamma-aminopropyltriethoxy silane. Remainder water.

Composition B.—0.5–2.0 percent by weight gamma-aminopropyltriethoxy silane; 0.3–0.6 percent by weight glycerine. Remainder water.

Composition C

| | Percent by weight |
|---|---|
| Partially dextrinized starch | 8.0 |
| Hydrogenated vegetable oil | 1.8 |
| Cationic wetting agent (lauryl amine acetate) | 0.4 |
| Non-ionic emulsifying agent | 0.2 |
| Gamma-aminopropyltriethoxy silane | 1.0 |
| Remainder water. | |

Composition D

| | Percent by weight |
|---|---|
| Polyester resin | 3.2 |
| Nopcogen 16 L | 0.1 |
| Triton X–100 | 0.1 |
| Polyvinyl alcohol | 0.1 |
| Polyvinyl pyrrolidone | 3.0 |
| Gamma-aminopropyltriethoxy silane | 0.3 |
| Acetic acid | 0.1 |
| Water | 93.1 |

In the foregoing examples, the gamma-aminopropyltriethoxy silane can be replaced, in whole or in part, with an equivalent amount of another amino silane, such as gamma-aminopropylvinyldiethoxy silane, gamma(triethoxysilylpropylamide)propyl amine, N(gamma-triethoxysilylpropyl)propylamine, gamma(triethoxysilylpropyloxy)propylamine, beta-aminoallyltriethoxy silane, para-aminophenyltriethoxy silane, aniline silane derivatives, and other amino silane compounds or organo silicon compounds, such as the corresponding silanol or polysiloxane formed of a silane having at least one but not more than three highly hydrolyzable groups such as a halogen group, a short chain alkoxy group or amino group and having an organic group attached directly or through an oxygen atom to the silicon atom in which the organic group contains less than 8 carbon atoms and also contains a free amine or an unsaturated group or a carboxyl group. Instead of making use of the described organo silicon compound, use can be made of Werner complex compounds in which the carboxylato group coordinated with the trivalent nuclear chromium atom contains less than 8 carbon atoms and a group identified as an amine, an ethylenic group or a carboxyl group.

It is preferred to make use of a composition in which the anchoring agent is embodied as a component of a glass fiber forming size, such as in compositions C or D, thereby to provide the glass fibers with a coating which enhances the processing as well as the performance characteristics to enable the glass fibers to be formed into yarns, cords and fabrics, while also permitting the treated glass fibers to be used as a reinforcement with the elastomeric material without the necessity previously to remove the protective size composition for replacement with an anchoring agent.

Instead of wiping the treating composition onto the glass fibers, the treating composition can be applied by other conventional coating systems, such as by spray coating, roller coating, flow coating and the like. It is preferred to apply the treating composition directly onto the bare glass fibers, as described in the forming operation, or after the original size has been removed.

Treatment of the glass fibers in forming, in the preferred practice of this invention, results in a treated glass fiber which has a low ignition loss and in which the filaments of glass fibers are capable of easy separation in the glass fiber bundle to enable fuller penetration of the strand of glass fibers in the subsequent treatment to impregnate the strand and coat the fibers with the impregnating composition containing an elastomeric material.

Glass fibers, coated in accordance with Example 1, can be dried at elevated temperature, but it is the usual practice to allow the sized or coated glass fibers to air dry thereby to provide the bundle 18 of glass fibers 16 in which the glass fibers are individually coated with a size coating 23.

Example 2.—Impregnation of glass fiber bundle

Composition E

| | Parts by weight |
|---|---|
| Neoprene rubber | 100 |
| Powdered magnesium oxide | 4 |
| Zinc oxide | 5 |
| Carbon black | 15 |
| Thiate B (trialkyl thiourea accelerator) | 1 |
| Toluene | 700 |

Composition F

| | Parts by weight |
|---|---|
| Natural rubber latex-resorcinol formaldehyde resin dispersed in aqueous medium (38% solids) | 15 |
| Water | 82 |
| Stearic acid | 1 |
| Aminox (reaction product of diphenyl amine-acetone) | 1 |
| Dicumyl peroxide | 1 |

Composition G

| | Parts by weight |
|---|---|
| Resorcinol formaldehyde resin | 2 |
| Formalin, 37% solution | 1.4 |
| Concentrated ammonium hydroxide solution | 5.0 |
| Vinylpyridine butadiene-styrene terpolymer latex (50% solids) | 25 |
| Neoprene rubber latex (50% solids) | 50 |
| Butadiene latex (60% solids) (Pyolite 2104) | 7.4 |
| Sodium hydroxide solution | 0.2 |
| Water | 58.0 |

Impregnation of the formed strand 18 of glass fibers can be made by way of a solvent bushing or it can be achieved by other conventional means for impregnation, such as by immersion of the bundle of glass fibers in a bath of impregnating composition. Referring more specifically to FIG. 3 of the drawings, the treated strands 18 of glass fibers are unwound from the spool 24 and advanced continuously over rollers 26 and 28 into the bath 30 of the treating Composition E, F or G housed in a container 32. From the container, the impregnated strand of glass fibers is passed upwardly through a wiping die 34 whereby excess composition is removed from the impregnated glass fiber strand and whereby the impregnating composition is worked into the strand more substantially to fill the interior thereof. The impregnated glass fiber strand or bundle 38 is advanced through a drying oven 36, maintained at an elevated temperature such as at a temperature within the range of 250–450° F. to remove the diluent and partially to advance the elastomeric components to a stage less than a fully cured or vulcanized stage.

From the drying oven, the impregnated strand 38 of glass fibers is drawn through the processing steps by means of power actuated pullers 44 and rewound on drum 46.

It is desirable to achieve as complete impregnation of the strand or bundle as is possible. Under such circumstances, the tremendous amount of surface area available between the individual glass fiber filaments and the impregnating elastomeric composition will contribute frictional resistance to relative movements in a manner to militate against slippage between the elastomeric material and the glass fibers. This additional resistance will operate to improve the bonding relationship established between the elastomeric component and the glass fiber surfaces. Thus the fibers will be in a position markedly to influence the physical and mechanical properties of the elastomeric system and to contribute exceptionally good reinforcement to the elastomeric product, especially in the combination which includes an elastomeric overcoating, as hereinafter defined, to integrate the impregnated glass fiber bundle with the continuous phase elastomer.

Impregnation or coating with the elastomeric impregnating composition can be improved by the technique of flexing or bending the strand or bundle of glass fibers while in the bath of the impregnating composition, as by running the strand or bundle over bars or other flexing or bending devices. Instead, or in combination therewith, fuller impregnation can be achieved by the use of pressure dies or by the passage of the glass fiber bundle through the device to provide for pulsations between high and low pressures to work the composition into the bundles while withdrawing occluded gases, or fuller impregnation can be achieved by the more recent techniques of ultrasonic vibration during impregnation.

In the product that is formed in Example 2, the fibers 16 making up the glass fiber bundle 18 will be cushioned one from the other by the impregnating elastomeric composition 40.

In the aforementioned copending application, description is made of the treatment of the impregnated strand or bundle to provide an overcoating of gamma-aminopropyltriethoxy silane or other amino silane or isocyanate, phenolic end-blocked isocyanate, or ethylene dimethacrylate, referred to as an assimilation coat, which operates substantially to eliminate the interface between the coatings on the glass fibers and the elastomer forming the continuous phase of the glass fiber-elastomeric product.

It has been found that instead of the assimilation coat, or in addition thereto, best results are secured when the impregnated glass fiber strand 38 is overcoated with an elastomer, preferably an elastomeric material which is the same as or compatible with the elastomeric material forming the continuous phase and the elastomeric material with which the glass fiber strand or bundle is impregnated and in which the elastomeric overcoating is preferably also formulated with a curing or vulcanizing agent for advancement of the elastomer to the cured or vulcanized stage along with the cure or vulcanization of the continuous phase elastomer during the exposure to heat and pressure for molding the elastomeric product.

In the preferred practice, the overcoat of elastomeric material is applied from a fluid rubber cement composition, as represented by the following example:

Example 3

| | Parts by weight |
|---|---|
| Oil extended butadiene-styrene rubber (SBR 712) | 80 |
| Prebroken smoked sheet natural rubber (65 Mooney) | 20 |
| Zinc oxide | 3 |
| Stearic acid | 5 |
| Carbon black | 50 |
| Pine tar | 5 |

Biphenylamine-acetone
    reaction product (Aminox) _____ 1
Diphenylguanidine (DPG) _____ .2
N-cyclohexyl-2-benzothiazole-
    sulfenamide (Santocure) _____ 1
Sulphur _____ 1.75

Example 4

Parts by weight
Carboxylated butadiene-styrene rubber _____ 80
Natural rubber _____ 20
Zinc oxide _____ 3
Stearic acid _____ 5
Carbon black _____ 50
Pine tar _____ 5
Biphenylamine-acetone
    reaction product (Aminox) _____ 1
Diphenylguanidine (DPG) _____ .2
N-cyclohexyl-2-benzothiazole-
    sulfenamide (Santocure) _____ 1
Sulphur _____ 1.75

The compositions are stirred into toluene or other rubber solvent in an amount to form a solution containing about 20% by weight solids.

The impregnated strand or bundle 38 of glass fibers is immersed in the fluid cement composition, as by advancement of the impregnated strand 38 downwardly into a bath 50 of the cement composition and then upwardly about rollers 52 through a die 54 for metering a proper amount of the cement onto the impregnated glass fiber bundle. The overcoated strand or bundle is advanced through an elevated temperature zone 56 or oven for the removal of diluent and then to a rewinding position 58. It is desirable to effect sufficient drying to enable the strand or bundle, with the overcoating 60, to be plied and/or twisted into reinforcing cords 62.

It will be apparent from the schematic illustration of the cord 62 that is formed, that the overcoated strands will appear in the interior of the cord to provide the additional amount of rubber needed substantially completely to fill any voids formed in the cord of twisted or intertwisted strands of the glass fiber bundles. Such flow of the additional rubber in the overcoating will occur to fill the voids in response to the compression during the application of heat and pressure during the molding operation. The rubber in the overcoating will blend with the rubber 64 of the continuous phase and cure therewith to produce an integrated structure.

It will be understood that other elastomeric materials can be employed to form the overcoating 60 and that other solvents can be used in formulating the fluid composition for overcoating the impregnated strands of glass fibers.

As previously pointed out, it is preferred to make use of an elastomeric component which is compatible both with the rubber of the impregnant and the rubber of the continuous phase 64. It will be understood also that the cement can be applied by other coating systems, such as by die coating, flow coating and the like to provide a relatively heavy coat 60 on the impregnated bundle 38 of glass fibers 16.

Another technique for overcoating the impregnated strand or bundle of glass fibers comprises the encasement of the strand 38 in a sheath, such as a spaghetti 66 formed of the elastomeric material. This can be accomplished most effectively and efficiently by extrusion of the elastomeric material about the impregnated bundle of glass fibers as a core whereby the impregnated bundle of glass fibers 38 becomes sheathed within a tube 66 of elastomeric material. The described overcoated and impregnated strands of glass fibers can be plied, twisted, and intertwisted with other such strands or bundles to form the reinforcing cord 62 for combination with the continuous phase elastomer. Any of the elastomeric materials previously described can be extruded to form the continuous overcoating 66 about the impregnated strand of glass fibers, such as butadiene-styrene rubber hydrochloride, isoprene, chloroprene, butyl rubber and the like.

The extruded rubber is insufficiently cured thereby to enable cold flow or flow under heat and pressure to fill the voids and to cure with the continuous phase elastomer to tie in all of the fibers with the elastomeric component.

The treated glass fibers can be embodied in any arrangement desired in the combination with a matrix of elastomeric materials for the manufacture of glass fiber-elastomeric products.

The concepts embodying this phase will be described with reference to the use of the plural coated glass fiber system in the manufacture of a belting formed of elastomeric material. It will be understood, however, that other combinations with the elastomeric coated fibers and matrix of elastomeric material can be secured in the fabrication of other elastomeric-glass fiber products to be characterized by high strength, good flexure, good dimensional stability, relative inertness, high temperature resistance, lack of fatigue and the like.

Example 5.—Fabrication of an eldless driving belt

In the manufacture of belting by the process of this invention, a belt forming mandrel is first wrapped with a layer of neoprene rubber, hereinafter referred to as a cushion coat. Over the cushion coat another layer of a lesser loaded neoprene rubber is wrapped to provide what is hereinafter referred to as an adhesion coat. Then the cords or strands of rubber coated glass fibers are wrapped around the adhesion coat, with or without previous coating of the surface of the adhesion coat with a tacky rubber cement to hold down the cords and to minimize shifting of the cords from a predetermined wrapped position thereby to permit more precise placement of the fibers in the final assembly. Over the layer of rubber coated glass fiber strands, yarns or cords, another cushion coat of neoprene is wrapped to form the completed assembly.

The multiple layers of materials wrapped about the tube forming mandrel are then sliced circumferentially in substantially parallel relationship with the glass fibers to form laterally separated strips. The strips are removed by collapsing the mold.

First the strips are "skived" or cut to V shape in the fabrication of a V belt. Thereafter the strip is "flipped" by wrapping the V cut strip with a rubber impregnated fabric. The V shaped belt can be formed directly without the skiving step and/or without the flipping step, as by molding directly under heat and pressure in a mold of V shape in cross-section.

Vulcanization of the assembly is carried out in the mold at a temperature of about 350° F. under positive pressure.

The cords formed of the plural coated glass fiber system described can also be used effectively as the reinforcing element in the manufacture of rubber tires by arrangement of the cords in the conventional manner in a bias wound or in a radially wound system in the tire carcass. Such plural coated fiber system can be fabricated into ply fabrics by any conventional method and employed in the tire assembly as any conventional ply.

The green tire is subjected to a normal molding process of heat and pressure for vulcanization of the elastomeric material in a tire mold. During the vulcanization process, the rubber in the overcoat 66 flows outwardly from the cords while the rubber stock 64 making up the matrix flows inwardly into the area between the cords. Thus the rubber in the overcoat and the rubber stock of the tire become intermingled for vulcanization together so that the vulcanization process penetrates into the interior of the reinforcing glass fiber cords.

I claim:

1. A glass fiber reinforcement for elastomeric-glass fiber products comprising a bundle formed of a plurality of glass fibers, a first coating on the individual glass fiber surfaces containing an anchoring agent for intergrating the elastomeric material with the glass fiber surfaces, an elastomeric composition in the form of a second coating impregnating the bundle of glass fibers coated with the anchoring agent substantially to coat the glass fibers in the bundle, and a third coating containing an elastomer about the impregnated bundle of glass fibers, said elastomer in the third coating being compatible with the elastomeric component impregnating the bundle of glass fibers and the elastomeric material in the elastomeric-glass fiber product, whereby said reinforcement will readily bond with the elastomeric material in the elastomeric-glass fiber product when placed therein.

2. A glass fiber reinforcement as claimed in claim 1 in which the anchoring agent is an organo silicon compound comprising a silane having from 1 to 3 highly hydrolyzable groups and an organic group attached to the silicon atom containing a group selected from the group consisting of an amine, an unsaturated ethylenic group and a carboxyl group.

3. A glass fiber reinforcement as claimed in claim 1 in which the anchoring agent is gamma-aminopropyltriethoxy silane.

4. In the method of producing glass fiber-elastomeric products having improved mechanical and physical properties, the steps of forming glass fiber reinforcements for said products by treating glass fibers to coat the glass fibers with a first coating containing an anchoring agent for integrating an elastomeric material with the glass fiber surfaces, gathering a plurality of the coated glass fibers into a glass fiber bundle, impregnating the glass fiber bundle with a composition containing an elastomeric material to form a second coat on the coated glass fibers, and coating the impregnated glass fiber bundle with a third coating containing an elastomeric material which is compatible with the elastomeric material in the impregnating composition and with the elastomer of the product, whereby said reinforcements will readily bond with the elastomeric material in the elastomeric-glass fiber product when placed therein.

5. The method as claimed in claim 4 in which the anchoring agent is an organo silicon compound formed of a silane having from 1 to 3 highly hydrolyzable groups and an organic group attached to the silicon atom containing a group selected from the group consisting of an amine, an unsaturated ethylenic group and a carboxyl group.

6. The method as claimed in claim 4 in which the anchoring agent is gamma-aminopropyltriethoxy silane.

7. The method as claimed in claim 4 which includes the step of heating the impregnated glass fiber bundle prior to the application of the third coat to advance the cure of the elastomeric material in the impregnating composition to less than the fully cured state.

8. The method as claimed in claim 4 in which the third coating of elastomeric material applied to the impregnated bundle of glass fibers is formed by the process of extruding the elastomeric material about the impregnated bundle of glass fibers.

9. The method as claimed in claim 4 which includes the steps of processing the impregnated and coated glass fiber bundles by plying to form reinforcing cords of the glass fiber bundles.

10. The method as claimed in claim 4 which includes the steps of combining the glass fiber reinforcements with the elastomeric material forming the matrix of the product and molding the system under heat and pressure to advance the elastomeric materials to the cured stage.

11. The method as claimed in claim 4 which includes the steps of processing the impregnated and coated glass fiber bundles by twisting to form reinforcing cords of the glass fiber bundles.

12. The method as claimed in claim 4 which includes the steps of processing the impregnated glass fiber bundles by twisting and intertwisting to form reinforcing cords of glass fiber bundles.

13. A glass fiber reinforcement as claimed in claim 1 in which the third coating about the bundle of impregnated glass fibers comprises a tube of elastomeric material sheathed about the bundle of glass fibers.

References Cited

UNITED STATES PATENTS

| | | | |
|---|---|---|---|
| 2,827,099 | 3/1958 | Youngs | 156—329 |
| 3,252,278 | 5/1966 | Marzocchi et al. | 156—308 |

ROBERT F. BURNETT, *Primary Examiner.*

R. A. FLORES, *Assistant Examiner.*